United States Patent
Sawada et al.

(10) Patent No.: US 7,358,007 B1
(45) Date of Patent: Apr. 15, 2008

(54) LAMINATE, METHOD FOR PREPARATION THEREOF, AND USE THEREOF

(75) Inventors: Yuji Sawada, Ichihara (JP); Yasushi Nakashima, Tokyo (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/069,001

(22) PCT Filed: Aug. 25, 2000

(86) PCT No.: PCT/JP00/05737

§ 371 (c)(1),
(2), (4) Date: Feb. 20, 2002

(87) PCT Pub. No.: WO01/17043

PCT Pub. Date: Mar. 8, 2001

(30) Foreign Application Priority Data

Aug. 27, 1999 (JP) .................................. 11242188

(51) Int. Cl.
*H01M 2/08* (2006.01)
*B21D 39/00* (2006.01)
*B05D 1/36* (2006.01)

(52) U.S. Cl. ...................... 429/185; 429/174; 429/139; 428/624; 427/409

(58) Field of Classification Search ................ 429/185, 429/174, 171, 163, 126, 144, 142, 139, 138, 429/7; 427/409, 417, 337, 58; 428/624, 428/686
See application file for complete search history.

(56) References Cited

U.S. PATENT DOCUMENTS 5,156,930 A  10/1992  Daio et al.

2002/0138958 A1 * 10/2002 Nonaka et al. ............. 29/25.03
2003/0194564 A1 * 10/2003 Araki et al. ................. 428/421

FOREIGN PATENT DOCUMENTS

| EP | 0 895 296 A1 |   | 2/1999  |
|----|--------------|---|---------|
| JP | 54-99972     | * | 8/1979  |
| JP | 09-283101    | * | 10/1997 |
| JP | 9-283101 A   |   | 10/1997 |
| JP | 11-67166 A   |   | 3/1999  |
| JP | 11-086808    | * | 3/1999  |
| JP | 11-86808 A   |   | 3/1999  |
| WO | WO 97-21779  | * | 6/1997  |

OTHER PUBLICATIONS

Abstract of the JP 54-099972, Showa Electric Co., "Flexible Printed Circuit Board Production", Aug. 7, 1979.*

* cited by examiner

*Primary Examiner*—Raymond Alejandro
(74) *Attorney, Agent, or Firm*—Birch, Stewart, Kolasch & Birch, LLP

(57) ABSTRACT

A laminate to be served as seal film for sealing the electrolyte of battery or as protection film for protecting the electrode part of battery, comprising a metal layer, a surface-treated layer formed over the surface of the metal layer and a layer of an adhesive resin of a polyolefin modified by carboxyl group or a group derived therefrom formed over the said surface-treated layer, which laminate is superior in the adhesive strength between the metal layer and the adhesive resin layer and in the fastness to organic polar solvents or to salts and, therefore, does not suffer from occurrence of interlayer separation on contacting with a non-aqueous solvent and, hence, can favorably be used in particular as seal film for sealing the electrolyte of secondary battery.

7 Claims, No Drawings

LAMINATE, METHOD FOR PREPARATION THEREOF, AND USE THEREOF

This application is the national phase under 35 U.S.C. § 371 of PCT International Application No. PCT/JP00/05737 which has an International filing date of Aug. 25, 2000, which designated the United States of America.

FIELD OF THE INVENTION

The present invention relates to a laminate obtained by laminating a metal and an adhesive resin to be served as seal film for sealing the electrolyte of battery or as protection film for protecting the electrode part of battery, in particular, a laminate to be served as seal film for sealing the electrolyte of secondary battery or as protection film for protecting the electrode part of secondary battery; to a process for producing it; and to use thereof.

BACKGROUND OF THE INVENTION

As an enclosure bag for enclosing a positive electrode, a negative electrode, electrolytic solution and so on constituting a non-aqueous electrolyte battery and taking out each of the lead wires for the positive and the negative electrode to the outside and for enclosing also these lead wires, a composite material laminated with a plastic in which a metal foil or a vacuum-deposited metal layer is interposed in a sandwich-like form is used. Such an enclosure bag requires that the plastic held contacting with the electrolytic solution on at least inner side does not dissolve in the electrolyte, so that an enclosure bag is proposed, in which the sealing reliability is remarkably increased by using a maleic acid-modified polyolefin resin for the inner most layer and by constructing the heat sealing part by this maleic acid-modified polyolefin resin (Japanese Patent Kokai Hei 9-283101 A).

The maleic acid-modified polyolefin resin is superior in the adhesion onto metal and in the heat-sealing performance, so that it is used in general as an adhesive resin. When, however, it is attempted to use the maleic acid-modified resin as a sealing film for batteries, as mentioned above, an interlayer separation may occur after the film is held continued in contact with the electrolytic solution and it cannot be used as a sealing film, though it exhibits superior adhesive strength directly after it is laminated with metal.

A non-aqueous electrolyte is one in which a salt is dissolved in an organic polar solvent. The reason of occurrence of the interlayer separation is assumed to be due to that the organic polar solvent and the salt will penetrate through the maleic acid-modified polyolefin layer and reach the metal layer to cause a reaction with the metal, since the maleic acid-modified polyolefin and the salt have an affinity to the maleic acid-modified polyolefin resin which is polarized by maleic acid. Conventional laminates have a problem that such an interlayer separation cannot be avoided. Further, it is necessary to attach a protective film to the positive and negative electrodes, since they are metal and subject to a possibility of occurrence of short-circuit. Here also a problem occurs in which the protective film peels off due to the same reason as the sealing film.

The object of the present invention is to provide a laminate to be served as seal film for sealing the electrolyte of battery or as protection film for protecting the electrode part of battery, in particular, for sealing the electrolyte of secondary battery or as protection film for protecting the electrode part of secondary battery, which laminate is superior in the adhesive strength between the metal layer and the adhesive resin layer and in the fastness to organic polar solvents or to salts and which does not suffer from interlayer separation even when being held in contact with a non-aqueous electrolyte or the like, and a process for its efficient production as well as its uses, in order to solve the problems mentioned above.

DISCLOSURE OF THE INVENTION

The present invention consists in the following laminate to be served as seal film for sealing the electrolyte of battery or as protection film for protecting the electrode part of battery, process for its production and its uses:

(1) A laminate to be served as seal film for sealing the electrolyte of battery or as protection film for protecting the electrode part of battery (referred to hereinafter sometimes simply as "the laminate"), comprising
  a metal layer,
  a surface-treated layer formed over the surface of the metal layer and
  a layer of an adhesive resin of a polyolefin modified by carboxyl group or a group derived therefrom, formed over the said surface-treated layer.

(2) A laminate to be served as seal film for sealing the electrolyte of battery or as protection film for protecting the electrode part of battery (referred to hereinafter sometimes simply as "the laminate"), comprising
  a metal layer,
  a surface-treated layer formed over the surface of the metal layer,
  a layer of a primer coating formed over the said surface-treated layer and
  a layer of an adhesive resin of a polyolefin modified by carboxyl group or a group derived therefrom, formed over the said primer coating layer.

(3) A laminate to be served as seal film for sealing the electrolyte of secondary battery or as protection film for protecting the electrode part of secondary battery (referred to hereinafter sometimes simply as "the laminate"), comprising
  a metal layer,
  a surface-treated layer formed over the surface of the metal layer and
  a layer of an adhesive resin of a polyolefin modified by carboxyl group or a group derived therefrom, formed over the said surface-treated layer.

(4) A laminate to be served as seal film for sealing the electrolyte of secondary battery or as protection film for protecting the electrode part of secondary battery (referred to hereinafter sometimes simply as "the laminate"), comprising
  a metal layer,
  a surface-treated layer formed over the surface of the metal layer,
  a layer of a primer coating formed over the said surface-treated layer and
  a layer of an adhesive resin of a polyolefin modified by carboxyl group or a group derived therefrom, formed over the said primer coating layer.

(5) The laminate as defined in any one of the above (1) to (4), wherein the metal layer is constituted of one or more metals selected from the group consisting of aluminum, nickel, copper, iron and alloys of them.

(6) The laminate as defined in any one of the above (1) to (5), wherein the surface-treated layer is constituted of a chemically treated layer.

(7) The laminate as defined in any one of the above (1) to (6), wherein the primer coating layer is that of thermosetting type based on epoxy, urethane, epoxy-urethane, imine, titanate, polyester or silane.

(8) The laminate as defined in any one of the above (1) to (7), wherein the adhesive resin is a graft-modified polyolefin resin obtained by graft-copolymerizing a polyolefin resin with an ethylenically unsaturated carboxylic acid.

(9) The laminate as defined in the above (8), wherein the graft-modified polyolefin resin is a graft-modified polyethylene resin or a graft-modified polypropylene resin.

(10) A process for producing a laminate to be served as seal film for sealing the electrolyte of battery or as protection film for protecting the electrode part of battery, comprising forming a surface-treated layer over the surface of a metal layer and laminating on the surface-treated layer a layer of an adhesive resin of a polyolefin resin modified by carboxyl group or a group derived therefrom.

(11) A process for producing a laminate to be served as seal film for sealing the electrolyte of battery or as protection film for protecting the electrode part of battery, comprising forming a surface-treated layer over the surface of a metal layer, forming a primer coating layer over the said surface-treated layer and laminating on the primer coating layer a layer of an adhesive resin of a polyolefin resin modified by carboxyl group or a group derived therefrom.

(12) A process for producing a laminate to be served as seal film for sealing the electrolyte of secondary battery or as protection film for protecting the electrode part of secondary battery, comprising forming a surface-treated layer over the surface of a metal layer and laminating on the surface-treated layer a layer of an adhesive resin of a polyolefin resin modified by carboxyl group or a group derived therefrom.

(13) A process for producing a laminate to be served as seal film for sealing the electrolyte of secondary battery or as protection film for protecting the electrode part of secondary battery, comprising forming a surface-treated layer over the surface of a metal layer, forming a primer coating layer over the said surface-treated layer and laminating on the primer coating layer a layer of an adhesive resin of a polyolefin resin modified by carboxyl group or a group derived therefrom.

(14) A seal film for sealing the electrolyte of battery or a protection film for protecting the electrode part of battery, which film is made from the laminate as defined in any one of the above (1), (2) and (5) to (9).

(15) A battery comprising a seal film for sealing the electrolyte of battery or a protection film for protecting the electrode part of battery, which film is made from the laminate as defined in any one of the above (1), (2) and (5) to (9).

(16) A seal film for sealing the electrolyte of secondary battery or a protection film for protecting the electrode part of secondary battery, which film is made from the laminate as defined in any one of the above (3) to (9).

(17) A secondary battery comprising a seal film for sealing the electrolyte of secondary battery or a protection film for protecting the electrode part of secondary battery, which film is made from the laminate as defined in any one of the above (3) to (9).

(18) A flexible package made from a laminate comprising
a metal layer,
a surface-treated layer formed over the surface of the metal layer and
a layer of an adhesive resin of a polyolefin modified by carboxyl group or a group derived therefrom, formed over the said surface-treated layer.

(19) A flexible package made from a laminate comprising
a metal layer,
a surface-treated layer formed over the surface of the metal layer,
a layer of a primer coating formed over the said surface-treated layer and
a layer of an adhesive resin of a polyolefin modified by carboxyl group or a group derived therefrom, formed over the said primer coating layer.

(20) The flexible package as defined in the above (18) or (19), wherein the metal layer is constituted of one or more metals selected from the group consisting of aluminum, nickel, copper, iron and alloys of them.

(21) The flexible package as defined in any one of the above (18) to (20), wherein the surface-treated layer is constituted of a chemically treated layer.

(22) The flexible package as defined in any one of the above (18) to (21), wherein the primer coating layer is that of thermosetting type based on epoxy, urethane, epoxy-urethane, imine, titanate, polyester or silane.

(23) The flexible package as defined in any one of the above (18) to (22), wherein the adhesive resin is a graft-modified polyolefin resin obtained by graft-copolymerizing a polyolefin resin with an ethylenically unsaturated carboxylic acid.

(24) The flexible package as defined in any one of the above (18) to (23), wherein the graft-modified polyolefin resin is a graft-modified polyethylene resin or a graft-modified polypropylene resin.

In the present invention, foils, sheets, plates and the like, which are used conventionally for laminates with adhesive resin, of, for example, aluminum, nickel, copper, iron and other simple substance metals, can be used.

The surface-treated layer formed on the surface of metal layer is a coating film layer formed by a surface-treatment for forming an inert protective film on a metal surface, for which chemically treated layers treated by an acid, such as chromic acid, phosphoric acid or so on, or an oxide film layer by an anodic oxidation or so on, may be exemplified. Among them, chemical treatment is preferred for the conventional operation and performance cost.

In the chemical treatment using chromic acid, phosphoric acid or so on, the metal, such as aluminum etc., is immersed in the chemical treatment bath containing chromic acid (salt) containing 0.05-5% by weight of trivalent chromium and/or phosphoric acid (salt) of pH 2-4 at 23-80° C. for 1 second-5 minutes to form a chemically treated film containing chromium. Among them, treatment by a chemical treating liquor containing chromic acid (salt) and phosphoric acid (salt) is preferred.

In the case of anodic oxidation, a metal, such as aluminum, is immersed in the electrolytic solution (5-25% by weight of sulfuric acid with 1-5 g/l of aluminum sulfate) maintained at 15-25° C. and is treated by direct current 15-20 V for 1-5 minutes to build up a passive film.

For the primer coating layer to be formed on the surface-treated layer, a primer paint used usually for base coat for coating on metal surface is used. For such a primer paint, a thermosetting type primer paint based on, for example, epoxy, urethane, epoxy-urethane, imine, titanate, polyester or silane, can be used. Among them, a primer paint based on epoxy is preferred, since it is superior in the adhesion onto a metal layer and onto a layer of an adhesive resin constituted of a polyolefin modified by carboxyl group or by a derivative thereof and in the durability than other primer paints, such as those based on urethane and so on.

For these primer paints, commercial products can be used. As commercial primer paints based on epoxy, DUFLON $K_{300}$ and ORGAPLASUF 30NC of Nippon Paint Co., Ltd., EPOMATE B002 and EPIKOTE 828 of Yuka Shell K.K. and ETON 2100E of Kawakami Paint Mfg. Co., Ltd. may be exemplified and, as commercial primer paints based on urethane, CORONATE L and NIPPORAN 1100 of Nippon Polyurethane Industry Co., Ltd. and A-310 and A-3 of Takeda Chemical Ind., Ltd. and, as commercial primer paints based on imine, P-1000 of Nippon Shokubai Kagaku Kogyo Co., Ltd. may be exemplified (all of them are trademarks), though not limited thereto.

For forming the primer coating layer using such a primer paint, the main agent constituting the primer paint and a hardening agent are dissolved in a suitable solvent and are coated on the surface-treated layer on the metal layer, followed by heating at the hardening temperature of the hardening agent used and hardening, if necessary with pressing, to build up the primer coating layer.

The polyolefin modified by carboxyl group or by a derivative thereof to be used as the adhesive resin according to the present invention is a graft-modified polyolefin (in the following, sometimes referred to simply as the polyolefin) in which a not yet modified polyolefin resin is co-polymerized by grafting reaction with preferably at least one polymerizable ethylenically unsaturated carboxylic acid or derivative thereof. As the not yet modified polyolefin resin, there may be exemplified a polyolefin resin, such as polypropylene and polyethylene. Among them, especially polypropylene is preferable in view of the heat resistance.

As the polypropylene, homopolymers of propylene, copolymers of propylene with, usually, not greater than 20 mole % of an α-olefin having two or more carbon atoms other than propylene, copolymers of propylene with ethylenically unsaturated carboxylic acids or derivatives thereof and so on may be recited. As the polyethylene, homopolymers of ethylene, copolymers of ethylene with, usually, not greater than 20 mole % of an α-olefin of 3 or more carbon atoms and copolymers of ethylene with ethylenically unsaturated carboxylic acids or derivatives thereof may be recited. In the case of copolymers, they may either be random copolymers or block-copolymers. For the ethylenically unsaturated carboxylic acids or derivatives thereof mentioned above to be co-polymerized with propylene or with ethylene, the same ones with those which will be described afterward may be used. As the not yet modified polyolefin resin, homopolymers of propylene, copolymer of propylene with α-olefin, homopolymers of ethylene and copolymers of ethylene with α-olefin are preferable. They may be used either each alone or in a combination of two or more of them.

In the modified polyolefins, the grafted amount (grafting proportion) of the ethylenically unsaturated carboxylic acid or the derivative thereof with respect to the entire modified polyolefin resin may favorably be 0.001-1% by weight, preferably 0.01-0.6% by weight.

As the ethylenically unsaturated polymerizable carboxylic acid or derivative thereof, which is to be grafted onto the not yet modified polyolefin resin, there may be enumerated, for example, acrylic acid, methacrylic acid, maleic acid, itaconic acid, citraconic acid, mesaconic acid, maleic anhydride, 4-methylcyclohex-4-en-1,2-dicarbocylic acid anhydride, bicyclo[2.2.2]oct-5-en-2,3-dicarboxylic acid anhydride, 1,2,3,4,5,8,9,10-octahydronaphthalene-2,3-dicarboxylic acid anhydride, 2-octa-1,3-diketospiro[4.4]-non-7-ene, bicyclo[2.2.1]hept-5-en-2,3-dicarboxylic acid anhydride, maleopimaric acid, tetrahydrophthalic acid anhydride, x-methylbicyclo[2.2.1]hept-5-en-2,3-dicarboxylic acid anhydride, x-methylnorbornen-5-en-2,3-dicarboxylic acid anhydride and norborn-5-en-2,3-dicarboxylic acid anhydride. Preferably maleic anhydride is used. They may be used either alone or in a combination of two or more of them.

For grafting a graft-monomer selected from the group consisting of ethylenically unsaturated carboxylic acids or derivatives thereof onto the not yet modified polyolefin resin, methods known from the past can be incorporated. For example, a method in which the polyolefin resin is melted and the graft-monomer is added thereto to effect the grafting reaction or a method in which the polyolefin resin is dissolved in a solvent to prepare a solution and the graft-monomer is added thereto to effect the grafting reaction may be recited. In each case, it is preferable to carry out the grafting reaction in the presence of a radical initiator in order to effect the graft-copolymerization efficiently. The grafting reaction is carried out usually under a condition of 60-350° C. The proportion of radical initiator to be used may usually be in the range of 0.001-1 part by weight, per 100 parts by weight of the not yet modified polyolefin resin.

For the radical initiator, organic peroxides may favorably be used and there may be enumerated, for example, benzoyl peroxide, dichlorobenzoyl peroxide, dicumyl peroxide, di-tert-butyl peroxide, 2,5-dimethyl-2,5-di(peroxybenzoate) hexyne-3,1,4-bis(tert-butylperoxy isopropyl)benzene, lauroyl peroxide, tert-butyl per-acetate, 2,5-dimethyl-2,5-di (tert-butylperoxy)hexyne-3,2,5-dimethyl-2,5-di(tert-butylperoxy)hexane, tert-butyl perbenzoate, tert-butylperphenyl acetate, tert-butyl perisobutyrate, tert-butyl per-sec-octoate, tert-butyl perpivalate, cumyl perpivalate and tert-butyl perdiethylacetate. Further, azo compounds, such as azobisisobutyronitrile and dimethylazoisobutyrate, may also be used.

For the radical initiator, at most preferable one for each specific grafting reaction process should be selected, while usually a dialkyl peroxide may be used preferably, such as dicumyl peroxide, di-tert-butyl peroxide, 2,5-dimethyl-2,5-di(tert-butylperoxy)hexyne-3,2,5-dimethyl-2,5-di(tert-butylperoxy)hexane and 1,4-bis-(tert-butylperoxyisopropyl) benzene.

The adhesive resin made of the polyolefin modified by carboxyl group or by derivative thereof is processed into a film or a sheet to form the adhesive resin layer. For such processing, known techniques, such as extrusion molding and inflation molding, can be employed.

The laminate according to the present invention can be produced by effecting a surface treatment on the surface of the metal layer to form a surface-treated layer and laying on the resulting surface-treated layer with a layer of an adhesive resin constituted of the polyolefin modified by carboxyl group or by derivative thereof or, alternatively, coating on the resulting surface-treated layer with a primer paint to form a primer coating layer and laying on the primer coating layer with a layer of an adhesive resin constituted of the polyolefin modified by carboxyl group or by derivative thereof. On forming the primer coating layer, it is preferable to heat and harden it, before laying the adhesive resin layer thereon and heating the laid layer to fusedly bond it, though it is permissible to lay the adhesive resin layer on the primer coating before the hardening thereof and to effect the hardening by making use of the heat upon the fusion bonding.

The laminate according to the present invention produced as above has a lamination structure of metal layer/surface-treated layer/adhesive resin layer or metal layer/surface-treated layer/primer coating layer/adhesive resin layer. In case the primer coating layer is present, the adhesion between the metal layer (surface-treated layer) and the adhesive resin layer is strengthened by the presence of the primer coating layer. When the non-aqueous electrolyte solution is held in contact with the adhesive resin layer on this side, occurrence of separation at the interface between the metal layer and the primer coating layer caused by the non-aqueous electrolyte solution is prevented by the presence of the surface-treated layer.

On the laminate of the present invention, one or more substrate resin layers constituted of one or more substrate resins, for example, polyolefin resins, such as polyethylene and polypropylene, polyester resins, such as polyethylene terephthalate etc., and others, can be laminated on the side reverse to the metal layer. The lamination structure in this case may be substrate resin layer/metal layer/surface-treated layer/adhesive resin layer or substrate resin layer/metal layer/surface-treated layer/primer coating layer/adhesive resin layer.

The laminate according to the present invention is used as a seal film for sealing the electrolyte solution of primary or secondary batteries or as a protection film for protecting the electrode part of primary or secondary batteries, wherein it is used by holding an organic polar solvent and/or a salt on the side of the adhesive resin layer in contact therewith. By using it, in particular, in a state of contacting with a non-aqueous electrolyte solution containing the organic polar solvent and the salt, it can be used adaptively as a seal film for sealing the electrolyte solution of secondary batteries or as a protection film for protecting the electrode part of secondary batteries, such as, in particular, non-aqueous electrolyte batteries and solid-state batteries. Here, it is possible to use it as a sealing bag for a battery by folding it so as to face the adhesive resin layer side to each other and heat-sealing it. The adhesive resin layer used according to the present invention is superior in the ability for being subjected to heat-sealing, so that prevention of leakage of non-aqueous electrolyte and long-term use for battery become possible.

For the organic polar solvent, aprotic polar solvents, for example, alkyl carbonates, esters and ketones, may be enumerated. Concrete examples include ethylene carbonate, propylene carbonate, butylene carbonate, dimethyl carbonate, ethyl methyl carbonate, diethyl carbonate, γ-butyrolactone, 1,2-dimethoxy-ethane, tetrahydrofuran, 2-methyltetrahydrofuran, 1,3-dioxolan, 4-methyl-1,3-dioxolan, methyl formate, 4-methyl-1,3-dioxomethyl formate, methyl acetate and methyl propionate.

As the salts, there may be recited alkali metal salts, such as lithium salts, sodium salts and potassium salts. For batteries, lithium salts, such as $LiPF_6$, $LiBF_4$ and Li-imide, are often used.

The non-aqueous electrolyte is one in which an alkali metal salt as given above is dissolved in an amount of 0.5-3 mmol in an organic aprotic polar solvent among those of cyclic carbonic acid esters, linear carbonic acid esters and mixtures of them.

The laminate, the seal film for sealing the electrolyte of battery, the protection film for protecting the electrode part of battery, the seal film for sealing the electrolyte of secondary battery and the protection film for protecting the electrode part of secondary battery according to the present invention can be used over a prolonged period of time without suffering from occurrence of interlayer separation between the metal layer, the surface-treated layer, the primer coating layer and the adhesive resin layer, even when they are used in a state of contacting with the above-mentioned polar solvent and/or the salt, in particular, with the non-aqueous electrolyte which is a mixture of them.

The battery according to the present invention is a battery which has a seal film for sealing the electrolyte of the battery or a protection film for protecting the electrode part of the battery made of the above-mentioned laminate. The battery according to the present invention can be used as a battery in a stable manner over a prolonged period of time, since the film mentioned above does not suffer from interlayer separation and can protect leakage of the non-aqueous electrolyte.

The secondary battery according to the present invention is a secondary battery which has a seal film for sealing the electrolyte of the secondary battery or a protection film for protecting the electrode part of the secondary battery made of the above-mentioned laminate. The secondary battery according to the present invention can be used as a battery in a stable manner over a prolonged period of time, since the film mentioned above does not suffer from interlayer separation and can protect leakage of the non-aqueous electrolyte.

The flexible package according to the present invention is a flexible packaging material made of the said laminate. The flexible package according to the present invention can be used for, such as a sealing bag for a battery, by folding it so as to face the adhesive resin layer side to each other and heat-sealing it. It can further be used as a sealing bag for, for example, electric and electronic parts, such as condenser etc.

As detailed above, the laminate according to the present invention is superior not only in the adhesive strength between the metal layer and the adhesive resin layer but also in the fastness to organic polar solvents or to salts and does not suffer from occurrence of interlayer separation even in contact with a non-aqueous solvent or the like, since the laminate is made by forming on the metal layer a surface-treated layer and laying thereon the adhesive resin layer under intermediation by a primer coating layer. For this reason, batteries in which the laminate is used as the seal film for sealing the electrolyte of the battery or as the protection film for protecting the electrode part of the battery and secondary batteries in which the laminate is used as the seal film for sealing the electrolyte of the secondary battery or as the protection film for protecting the electrode part of the secondary battery can be used in a stable manner over a prolonged period of time.

THE BEST MODE FOR EMBODYING THE INVENTION

Below, the present invention will be described by way of Examples of the present invention, in which % values are give on the weight basis.

Example 1

Preparation of Test Specimen

An aluminum plate (JIS-H419, 140×60×0.2 mm) was immersed in a chemical treatment liquor of phosphoric acid/chromic acid as a surface-treating agent in pure water (a liquid in which a trivalent chromium concentration was adjusted at 0.24%) and then washed with water, followed by drying in an air oven of 100° C. for 20 minutes, whereby a treated aluminum plate specimen A was prepared.

A layer of a maleic anhydride-modified polypropylene resin (MFR=3 g/10 min., grafted amount of maleic anhydride=0.15%, film thickness=50 μm) as the adhesive resin was laid over the treated aluminum specimen A and the resulting laminate was press-bonded [preheating: 180° C.×3 min., pressing: 180° C.×1 min. under a pressure of 0.59 MPa (6 kg/cm$^2$), cooling: 15° C.×3 min. under a pressure of 0.49 MPa (5 kg/cm$^2$)]. Assessment of the adhesive strength onto the aluminum specimen gave a value of 8.0 N/15 mm.

The condition of peeling:

15 mm width, 180° peeling, 50 mm/min. (i.e. a laminate having a width of 15 mm was tested by peeling off in the direction of 180° at a peeling velocity of 15 mm/min.; the same applies to all appearing afterwards).

Durability Immersion Test

An electrolyte in which the proportions of ethylene carbonate, methyl ethyl carbonate and LiPF$_8$ are adjusted at 30%, 55% and 15%, respectively, was poured into a cylindrical stainless steel kettle of a capacity od one liter, whereupon the specimen described above was immersed in the electrolyte. Then the kettle was sealed completely with a lid so as not to permit leakage of the liquid and was stood still under a state heated at 80° C. in a constant temperature bath for 10 days. Then, the stainless steel kettle was opened after it was cooled to room temperature and the specimen was taken out, followed by sufficient washing off of the electrolyte. Assessment of the adhesive strength onto the aluminum specimen gave a value of 4.5 N/15 mm.

The condition of peeling:
180° peeling, 50 mm/min.

Example 2

In the procedures of EXAMPLE 1, a treated aluminum plate specimen B was prepared by the surface-treatment and subsequent application of DUFLON K300 (trademark) of Nippon Paint Mfg. Co., Ltd. as the primer coating based on epoxy with a pretreatment performed by heating at 170° C.×15 min. in an oven. Assessment of the adhesive strength in the same manner as in Example 1 gave a result of impossible peeling off both before and after the immersion (the adhesive resin destroyed the substrate resin).

Example 3

Test was carried out in the same manner as in EXAMPLE 2, except that ORGAPLASUF 30NC (trademark) of Nippon Paint Mfg. Co., Ltd. was used as the primer coating based on epoxy. The results are recited in Table 1.

Example 4

Test was carried out in the same manner as in EXAMPLE 2, except that EPOMATE B002/EPIKOTE 828 (trademark) of Yuka-Shell K.K. was used as the primer coating based on epoxy and the pretreatment was carried out by heating at 180° C.×10 min. The results are recited in Table 1.

Example 5

Test was carried out in the same manner as in EXAMPLE 2, except that ETON 2100E (trademark) of Kawakami Paint Mfg. Co., Ltd. was used as the primer coating based on epoxy and the pretreatment was carried out by heating at 120° C.×20 min. The results are recited in Table 1.

Example 6

Test was carried out in the same manner as in EXAMPLE 2, except that maleic anhydride-modified polypropylene (MFR=7 g/10 min., grafted amount of maleic anhydride=0.15%) was used for the adhesive resin film. The results are recited in Table 1.

Example 7

Test was carried out in the same manner as in EXAMPLE 2, except that maleic anhydride-modified polyethylene (MFR=1.0 g/10 min., grafted amount of maleic anhydride=0.11%) was used for the adhesive resin film. The results are recited in Table 1.

Example 8

Test was carried out in the same manner as in EXAMPLE 2, except that maleic anhydride-modified polyethylene (MFR=2.9 g/10 min., grafted amount of maleic anhydride=0.18%) was used for the adhesive resin film. The results are recited in Table 1.

Example 9

Test was carried out in the same manner as in EXAMPLE 2, except that CORONATE L/NIPPORAN 1100 (trademark) of Nippon Polyurethane Industry Co., Ltd. was used as the primer paint based on urethane and the pretreatment was carried out by heating at 80° C.×5 minutes. The results are recited in Table 1.

Example 10

Test was carried out in the same manner as in EXAMPLE 2, except that A-310/A-3 (trademark) of Takeda Chemical Ind., Ltd. was used as the primer paint based on urethane and the pretreatment was carried out by heating at 80° C.×5 minutes. The results are recited in Table 1.

Example 11

Test was carried out in the same manner as in EXAMPLE 2, except that P-1000 (trademark) of Nippon Shokubai Kagaku Kogyo Co., Ltd. was used as the primer paint based on imine and the pretreatment was carried out by heating at 80° C.×10 minutes. The results are recited in Table 1.

Comparative Example 1

An aluminum plate was immersed in a toluene solution and was subjected to an ultrasonic cleaning for 20 minutes. In the same manner as in EXAMPLE 2, the primer coating layer and the adhesive resin layer were laminated on the cleaned aluminum plate without forming a surface-treated layer thereon, whereupon the test was carried out. The results are recited in Table 1.

Comparative Example 2

An aluminum plate was immersed in a toluene solution and was subjected to an ultrasonic cleaning for 20 minutes. In the same manner as in EXAMPLE 3, the primer coating layer and the adhesive resin layer were laminated on the cleaned aluminum plate without forming a surface-treated layer thereon, whereupon the test was carried out. The results are recited in Table 1.

Comparative Example 3

An aluminum plate was immersed in a toluene solution and was subjected to an ultrasonic cleaning for 20 minutes. In the same manner as in EXAMPLE 4, the primer coating layer and the adhesive resin layer were laminated on the cleaned aluminum plate without forming a surface-treated layer thereon, whereupon the test was carried out. The results are recited in Table 1.

Comparative Example 4

An aluminum plate was immersed in a toluene solution and was subjected to an ultrasonic cleaning for 20 minutes. In the same manner as in EXAMPLE 5, the primer coating layer and the adhesive resin layer were laminated on the cleaned aluminum plate without forming a surface-treated layer thereon, whereupon the test was carried out. The results are recited in Table 1.

Comparative Example 5

Test was carried out in the same manner as in Example 2 except that a film of the adhesive resin was laid directly on the aluminum plate which had been subjected to a surface treatment in the same manner as in Example 2 without forming thereon the primer coating layer based on epoxy and the laminate was press-bonded [preheating: 180° C.×3 minutes, pressing: 180° C.×1 minute under a pressure of 0.59 MPa (6 kg/cm$^2$), cooling: 15° C.×3 minutes under a pressure of 0.49 MPa (5 kg/cm$^2$)]. The results are recited in Table 1.

TABLE 1

| | Adhesive Strength (N/15 mm) | |
|---|---|---|
| | Before Immersion | After Imm. |
| EXAMPLE | | |
| 1 | 8.0 | 4.5 |
| 2 | Unpeelable (substr. destr.*) | Unpeelable |
| 3 | Unpeelable (substr. destr.) | Unpeelable |
| 4 | Unpeelable (substr. destr.) | 3.3 |
| 5 | Unpeelable (substr. destr.) | 6.8 |
| 6 | Unpeelable (substr. destr.) | Unpeelable |
| 7 | 11.2 | 10.5 |
| 8 | 11 | 8.8 |
| 9 | 10.8 | 5.6 |
| 10 | 9.6 | 4.5 |
| 11 | 5.8 | 1.2 |
| COMPAR. EXAMPLE | | |
| 1 | Unpeelable (substr. destr.) | 0 (peeled) |
| 2 | Unpeelable (substr. destr.) | 0 (peeled) |
| 3 | Unpeelable (substr. destr.) | 0 (peeled) |
| 4 | Unpeelable (substr. destr.) | 0 (peeled) |
| 5 | Unpeelable (substr. destr.) | 0 (peeled) |

Note:
*substrate destroyed

INDUSTRIAL APPLICABILITY

The laminate according to the present invention is superior not only in the adhesive strength between the metal layer and the adhesive resin layer but also in the fastness to organic polar solvents or to salts and does not suffer from occurrence of interlayer separation upon contact with non-aqueous electrolyte and the like, so that it can be used adaptively as protection film for protecting the electrode part of primary and secondary batteries or as protecting film for protecting the electrode part of secondary batteries, whereby it is made possible to obtain primary or secondary batteries which can be used in a stable manner for prolonged period of time.

The invention claimed is:

1. A laminate for sealing an electrolyte or protecting an electrode of a battery, comprising
    a metal layer,
    an inert protective layer formed over the surface of the metal layer in contact with said metal layer, wherein the inert protective layer is a reaction product of a chemical reaction of the metal layer surface with a chemical treating liquor containing chromic acid (salt) and phosphoric acid (salt), and
    a layer of an adhesive resin comprised of polyolefin modified by a grafting reaction with maleic anhydride, formed over the inert protective layer and fusedly bonded with heat thereto, wherein said polyolefin to be modified by the grafting reaction with maleic anhydride being a homopolymer of ethylene or propylene or a copolymer of ethylene or propylene with an α-olefin having two or more carbon atoms or with an ethylenically unsaturated carboxylic acid or a derivative thereof.

2. The laminate as claimed in claim 1, wherein the metal layer is comprised of one or more metals selected from the group consisting of aluminum, nickel, copper, iron and alloys thereof.

3. A seal film for sealing an electrolyte of a battery or a protective film for protecting an electrode of a battery, which film is made from the laminate as claimed in claim 1.

4. A seal film for sealing an electrolyte of a secondary battery or a protective film for protecting an electrode of a secondary battery, which film is made from the laminate as claimed in claim 1.

5. The laminate as claimed in claim 1, wherein the adhesive resin has an adhesive strength of 5.8 N/15 mm up to an adhesive strength rendering a film unpeelable when said film is formed of the adhesive resin in direct contact with the inert protective layer formed by acid treatment of an aluminum layer.

6. The laminate as claimed in claim 1, wherein the adhesive resin layer is in contact with the inert protective layer, or the adhesive resin layer is in contact with a primer coating layer and the primer coating layer is in contact with the inert protective layer.

7. A laminate for sealing an electrolyte or protecting an electrode of a battery, comprising
  a metal layer,
  an inert protective layer formed over the surface of the metal layer in contact with said metal layer, wherein the inert protective layer is a reaction product of a chemical reaction of the metal layer surface with a chemical treating liquor containing chromic acid (salt) and phosphoric acid (salt), and
  a layer of an adhesive resin comprised of a polyolefin modified by a grafting reaction with maleic anhydride, formed over the inert protective layer and fusedly bonded with heat thereto, wherein the polyolefin modified by the grafting reaction with maleic anhydride has been prepared by modifying a polyolefin which is a homopolymer of ethylene or propylene or a copolymer of ethylene or propylene with an α-olefin having two or more carbon atoms or with an ethylenically unsaturated carboxylic acid.

* * * * *